(12) United States Patent
Plaisted et al.

(10) Patent No.: US 7,857,269 B2
(45) Date of Patent: Dec. 28, 2010

(54) MOUNTING ASSEMBLY FOR ARRAYS AND OTHER SURFACE-MOUNTED EQUIPMENT

(75) Inventors: Joshua Reed Plaisted, Oakland, CA (US); Brian West, San Francisco, CA (US)

(73) Assignee: PVT Solar, Inc., Berkeley, CA (US)

(*) Notice: Subject to any disclaimer, the term of this patent is extended or adjusted under 35 U.S.C. 154(b) by 151 days.

(21) Appl. No.: 11/947,658

(22) Filed: Nov. 29, 2007

(65) Prior Publication Data

US 2008/0121273 A1    May 29, 2008

Related U.S. Application Data

(60) Provisional application No. 60/867,771, filed on Nov. 29, 2006.

(51) Int. Cl.
*E04G 3/20* (2006.01)
(52) U.S. Cl. ............ 248/237; 52/173.3; 248/125.8
(58) Field of Classification Search ........ 248/237, 248/125.8, 125.1, 121; 52/173.3; 136/244, 136/251; 249/219.1
See application file for complete search history.

(56) References Cited

U.S. PATENT DOCUMENTS

| | | | |
|---|---|---|---|
| 1,159,372 A * | 11/1915 | Goff .................... | 248/237 |
| 1,306,434 A * | 6/1919 | Melanson ............... | 248/237 |
| 2,747,166 A | 5/1956 | Hoffarth | |
| 3,881,799 A | 5/1975 | Elliott et al. | |
| 4,029,080 A | 6/1977 | Warren | |
| 4,061,413 A | 12/1977 | Keller | |
| 4,150,660 A | 4/1979 | Peters et al. | |
| 4,239,555 A | 12/1980 | Scharlack et al. | |
| 4,336,413 A | 5/1982 | Tourneux | |
| 4,372,292 A | 2/1983 | Ort | |
| 4,636,577 A | 1/1987 | Peterpaul | |
| 4,936,063 A | 6/1990 | Humphrey | |
| 4,961,712 A | 10/1990 | Schwenk et al. | |
| 4,993,959 A | 2/1991 | Randolph | |

(Continued)

FOREIGN PATENT DOCUMENTS

DE    19804685 A1    2/1998

(Continued)

OTHER PUBLICATIONS

Communication Pursuant to Article 94(3) EPC in Application No. 06733720.4-1266, European Patent Office, Jul. 16, 2008, 6 pages.

(Continued)

*Primary Examiner*—Ramon O Ramirez
(74) *Attorney, Agent, or Firm*—Mahamedi Paradice Kreisman LLP

(57) ABSTRACT

A mounting system is provided for supporting equipment such as solar module arrays on a rooftop or other underlying surface. The mounting system includes a pipe, and a grasp section. These couple to a base that is extended into or otherwise integrated with the underlying surface. The pipe may be coupled so as to extend a height from the underlying surface. The grasp section is coupled to a top section of the pipe and is structured to secure to a section of the solar module array when the solar module array is installed on the underlying surface.

15 Claims, 9 Drawing Sheets

U.S. PATENT DOCUMENTS

| | | | |
|---|---|---|---|
| 5,180,442 A | 1/1993 | Elias | |
| 5,338,369 A | 8/1994 | Rawlings | |
| 5,409,549 A | 4/1995 | Mori | |
| 5,451,167 A | 9/1995 | Zielinski et al. | |
| 5,497,587 A | 3/1996 | Hirai et al. | |
| 5,524,401 A | 6/1996 | Ishikawa et al. | |
| 5,571,338 A | 11/1996 | Kadonome et al. | |
| 5,603,187 A * | 2/1997 | Merrin et al. | 52/58 |
| 5,687,453 A | 11/1997 | Megregian et al. | |
| 5,740,996 A | 4/1998 | Genschorek | |
| 5,788,204 A * | 8/1998 | Goodwin et al. | 248/357 |
| 5,986,203 A | 11/1999 | Hanoka et al. | |
| 6,106,310 A | 8/2000 | Davis et al. | |
| 6,195,066 B1 * | 2/2001 | Pegues et al. | 343/883 |
| 6,201,179 B1 | 3/2001 | Dalacu | |
| 6,269,596 B1 | 8/2001 | Ohtsuka et al. | |
| 6,283,770 B1 | 9/2001 | Leung et al. | |
| 6,320,120 B1 | 11/2001 | Van Haaster | |
| 6,323,478 B1 | 11/2001 | Fujisaki et al. | |
| 6,366,304 B1 | 4/2002 | Nakayasu et al. | |
| 6,465,724 B1 | 10/2002 | Garvison et al. | |
| 6,521,821 B2 | 2/2003 | Makita et al. | |
| 7,012,188 B2 | 3/2006 | Erling | |
| 7,293,748 B1 * | 11/2007 | Hoser | 248/146 |
| 7,406,800 B2 | 8/2008 | Cinnamon et al. | |
| 7,419,377 B1 | 9/2008 | Briere et al. | |
| 7,469,508 B2 | 12/2008 | Ceria | |
| 7,592,537 B1 | 9/2009 | West | |
| 7,721,492 B2 | 5/2010 | Plaisted et al. | |
| 2003/0010372 A1 | 1/2003 | Dinwoodie | |
| 2003/0015637 A1 | 1/2003 | Liebendorfer | |
| 2003/0071177 A1 * | 4/2003 | Aussiker | 248/125.8 |
| 2003/0094193 A1 | 5/2003 | Mapes et al. | |
| 2003/0201009 A1 | 10/2003 | Nakajima et al. | |
| 2004/0011354 A1 | 1/2004 | Erling | |
| 2004/0163338 A1 | 8/2004 | Liebendorfer | |
| 2005/0161074 A1 | 7/2005 | Garvison et al. | |
| 2006/0032527 A1 | 2/2006 | Stevens et al. | |
| 2006/0042682 A1 | 3/2006 | Wolfe et al. | |
| 2006/0086382 A1 | 4/2006 | Plaisted | |
| 2006/0118163 A1 | 6/2006 | Plaisted | |
| 2006/0124167 A1 | 6/2006 | Fan et al. | |
| 2007/0251567 A1 | 11/2007 | Plaisted | |
| 2007/0295391 A1 | 12/2007 | Lenox et al. | |
| 2008/0053009 A1 | 3/2008 | Plaisted | |
| 2008/0053517 A1 | 3/2008 | Plaisted | |
| 2008/0169018 A1 | 7/2008 | Miyamoto et al. | |
| 2009/0019796 A1 * | 1/2009 | Liebendorfer | 52/173.3 |
| 2009/0038668 A1 | 2/2009 | Plaisted | |

FOREIGN PATENT DOCUMENTS

| | | |
|---|---|---|
| EP | 0417303 A1 | 3/1991 |
| EP | 0614058 A2 | 2/1994 |
| EP | 0587348 A2 | 3/1994 |
| EP | 0599497 A1 | 6/1994 |
| EP | 0905795 A2 | 3/1999 |
| EP | 1873843 A2 | 1/2007 |
| JP | 11-186586 A | 7/1999 |
| JP | 11-204819 A | 7/1999 |
| JP | 2000-100490 A | 4/2000 |
| JP | 2001-214579 A | 8/2001 |
| JP | 2001-262800 A | 9/2001 |
| JP | 2004-251037 A | 9/2004 |
| JP | 2005-194771 A | 7/2005 |
| JP | 2007-262764 A | 10/2007 |
| WO | WO 0214407 | 5/2002 |

OTHER PUBLICATIONS

Final Office Action dated Jun. 10, 2009 in U.S. Appl. No. 11/851,299, 10 pages.
Final Office Action dated Oct. 6, 2008 in U.S. Appl. No. 10/855,254, 21 pgs.
International Preliminary Report on Patentability in International Application PCT/US2006/001593, World Intellectual Property Organization, Jul. 26, 2007, 11 pages.
International Search Report and Written Opinion of Sep. 30, 2009 10 pages.
International Search Report and Written Opinion of the International Searching Authority in International Application PCT/US2007/77433, World Intellectual Property Organization, Mar. 26, 2006, 10 pages.
International Search Report and Written Opinion of the International Searching Authority in International Application PCT/US2007/69304, World Intellectual Property Organization, Mar. 4, 2008, 12 pages.
International Search Report and Written Opinion of the International Searching Authority in International Application PCT/US2006/001593, World Intellectual Property Organization, Oct. 27, 2006, 19 pages.
Non-Final Office Action Dated Jun. 1, 2009 in U.S. Appl. No. 10/855,254, 17 pgs.
Non-Final Office Action dated Jun. 22, 2009 in U.S. Appl. No. 11/332,000, 13 pages.
Non-Final Office Action dated Nov. 13, 2008 in U.S. Appl. No. 11/851,299, 9 pgs.
Non-Final Office Action dated Jan. 24, 2008 in U.S. Appl. No. 10/855,254, 16 pgs.
TELESTRUT Telescoping Strut; UNISTRUT; http://web.archive.org/web/20030202040614/http://www.unistrut.com/.
Unistrut Telespar Telescoping Tubing; UNISTRUT; http://web.archive.org/web/20030202040614/http://www.unistrut.com/.
Final Office Action dated Dec. 7, 2009 in U.S. Appl. No. 11/332,000, 11 pgs.
Final Office Action dated Dec. 4, 2009 in U.S. Appl. No. 10/855,254, 18 pgs.
International Preliminary Report on Patentability in International Application PCT/US2007/075531, World Intellectual Property Organization, Oct. 15, 2009, 8 pages.
Non-Final Office Action dated Mar. 15, 2010 in U.S. Appl. No. 11/750,948; 9 pgs.
Notice of Allowance datedJan. 11, 2010 in U.S. Appl. No. 11/851,299; 8 pgs.
Restriction Requirement dated May 24, 2010 in U.S. Appl. No. 11/848,766; 6 pgs'.
Restriction Requirement dated Mar. 5, 2010 in U.S. Appl. 11/848,766; 6 pgs'.
Non-Final Office Action dated Jul. 12, 2010 in U.S. Appl. No. 11/848,766.
Non-Final Office Action dated Aug. 2, 2010 in U.S. Appl. No. 10/855,254; 28 pgs.
Notice of Allowance dated Sep. 30, 2010 in U.S. Appl. No. 11/750,948.
Notice of Allowance dated Sep. 27, 2010 in U.S. Appl. No. 11/332,000.

* cited by examiner

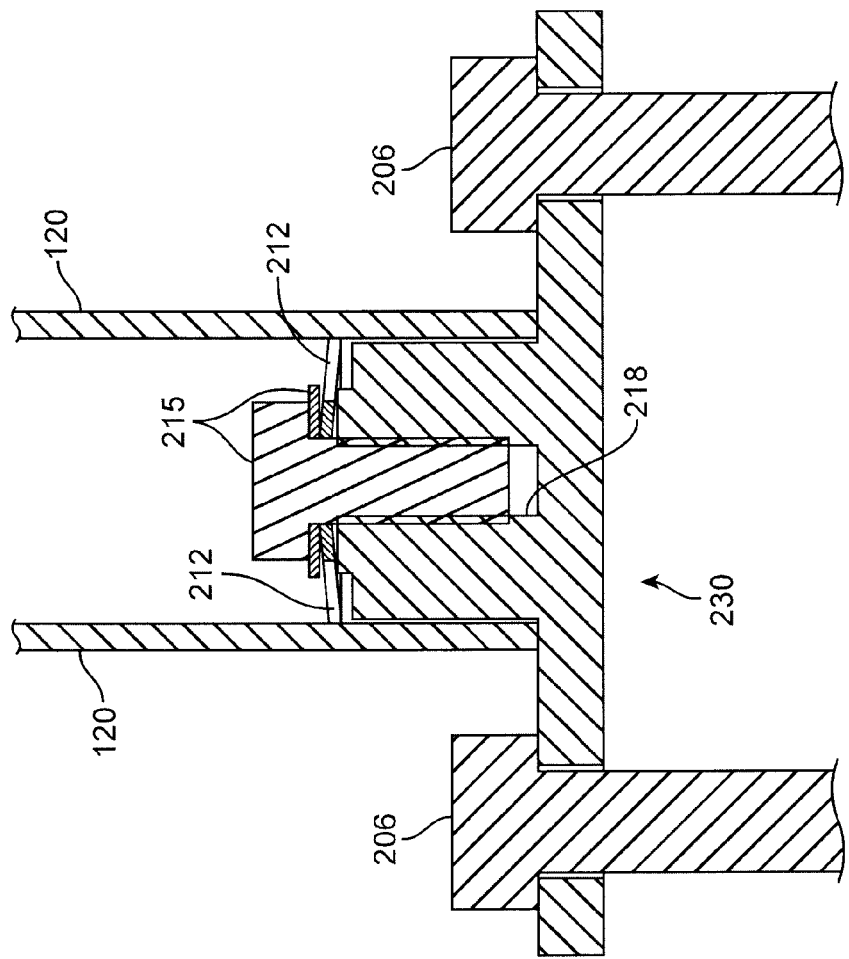
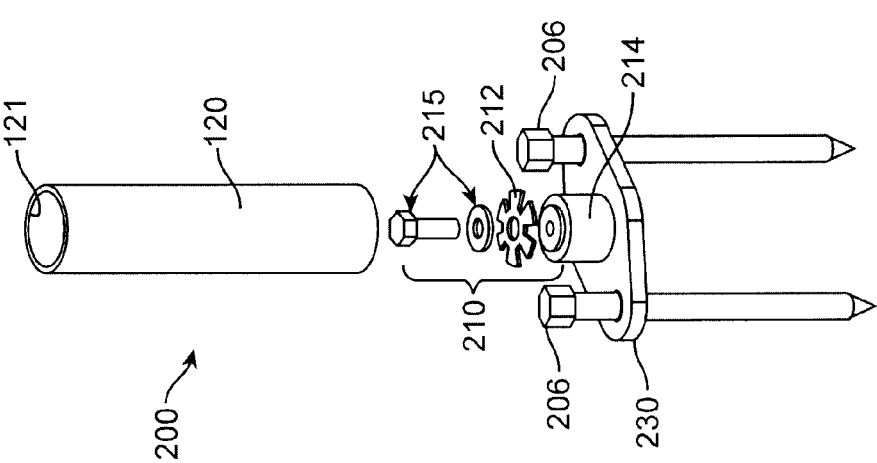
FIG. 2B
FIG. 2A

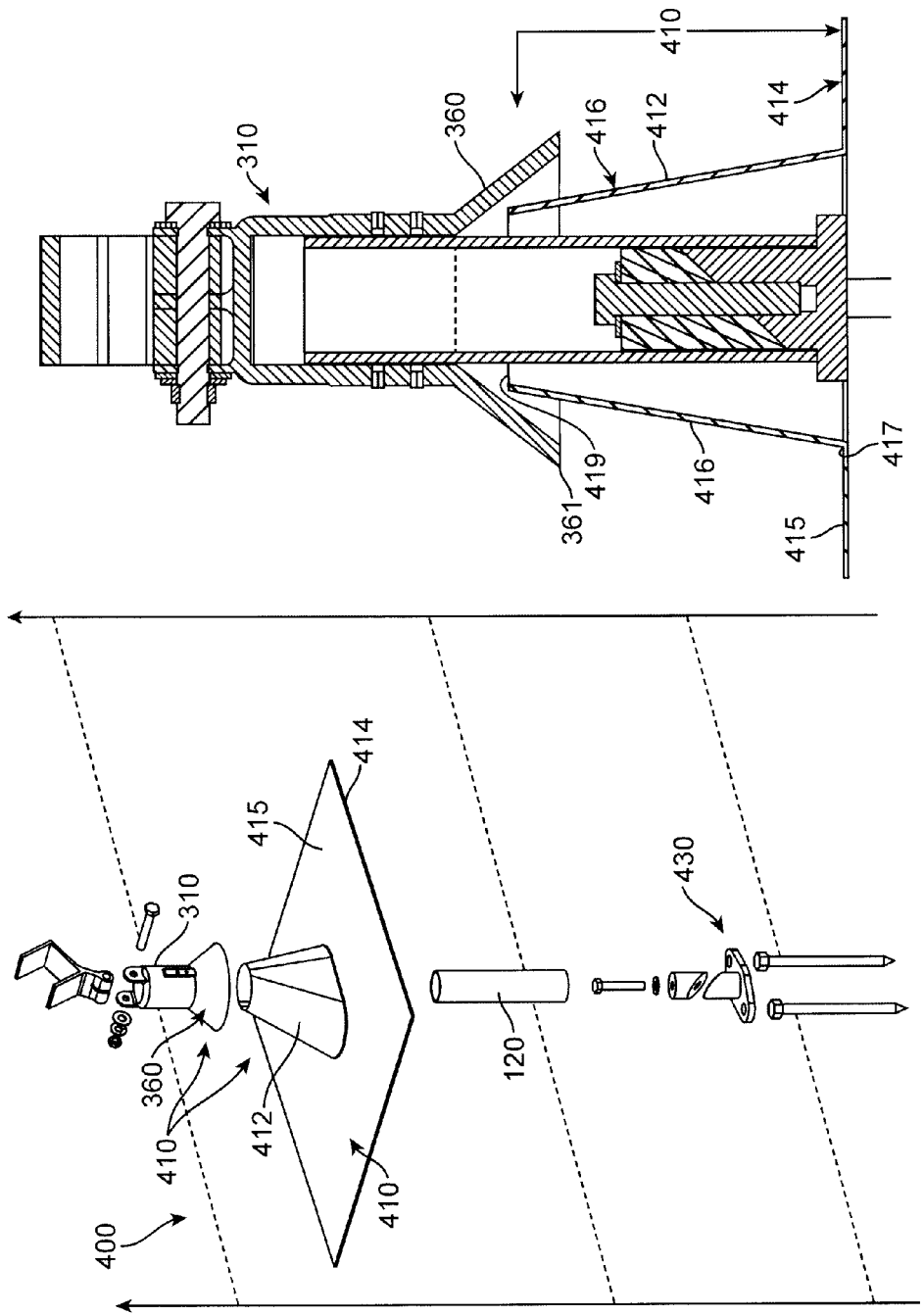

MOUNTING ASSEMBLY FOR ARRAYS AND OTHER SURFACE-MOUNTED EQUIPMENT

RELATED APPLICATIONS

This application claims priority to Provisional U.S. Patent Application No. 60/867,771 filed Nov. 29, 2006, entitled METHODS FOR MOUNTING EQUIPMENT WITH CIRCULAR PIPE; the aforementioned priority application being hereby incorporated by reference in its entirety.

BACKGROUND

One of the easiest ways to secure equipment such as a solar array to a roof or to the ground is to use structural pipe. Unfortunately, there are some difficulties with mounting equipment with pipe or other forms of structural tubing.

One problem is that there is no easy way to attach pipe directly to a roof or to the ground. Current techniques often require the pipe to have pre-made threads at the bottom end of the pipe or requires the threads to be made on the pipe on the jobsite. The threaded end of the pipe may then be screwed into a flange or base that is in turn secured to the mounting surface.

Another problem with conventional techniques is that when equipment is mounted with pipe, it is difficult to level the equipment. Some designs described below allow for a few inches of play at the top of the pipe that can be used to level the equipment.

BRIEF DESCRIPTION OF THE DRAWINGS

FIG. 2A and FIG. 2B illustrate a mounting system that uses a star-washer sub-assembly to interconnect the base with an extension section, according to an embodiment.

FIG. 4A is a mounting assembly shown with multiple water proofing features, according to an embodiment.

FIG. 4B is a side cross-sectional view of FIG. 4A, cut along lines B-B, under an embodiment of the invention.

FIG. 6B illustrates a variation in which an additional hinge support structure is used to with a mounting assembly, according to an embodiment.

FIG. 6C illustrates the use of an alternative double grasp structure to provide additional support for retaining equipment, according to an embodiment.

DETAILED DESCRIPTION

An embodiment includes a mounting system for supporting equipment such as solar module arrays on a rooftop or other underlying surface. The mounting system includes a pipe, and a grasp section. The pipe is securely mounted to the underlying surface by way of a base and suitable attachment hardware. The pipe may be coupled so as to extend a height from the underlying surface. The grasp section is coupled to a top section of the pipe and is structured to secure to a section of the solar module array when the solar module array is installed on the underlying surface.

According to another embodiment, a mounting system is provided for supporting equipment on an underlying surface. The mounting system includes a base, an extension section and a grasp section. The base may be structured to secure and/or integrate into to the underlying surface. An extension section includes one or more members that are connected to the base so as to extend a height from the underlying surface. The grasp section is connected to a top section of the extension section and is structured to secure to a section of the equipment when the equipment is installed on the underlying surface.

Some designs also add another level of waterproofing to the mounting area by providing a secondary counter-flashing around the pipe just above the mounting area.

Some of the embodiments described herein provide for assemblies that connect circular pipe to strut style rails in a rigid or pivoted manner. The strut style rails may be either common channel style strut such as UNISTRUT of Wayne, Mich. or B-Line of Highland, Ill. or any type of structural rail that allows for the attachment of equipment.

As used herein, the term "couple" or "coupled" means connected directly (without intermediate elements) or indirectly (with intermediate elements).

Figure 1A:
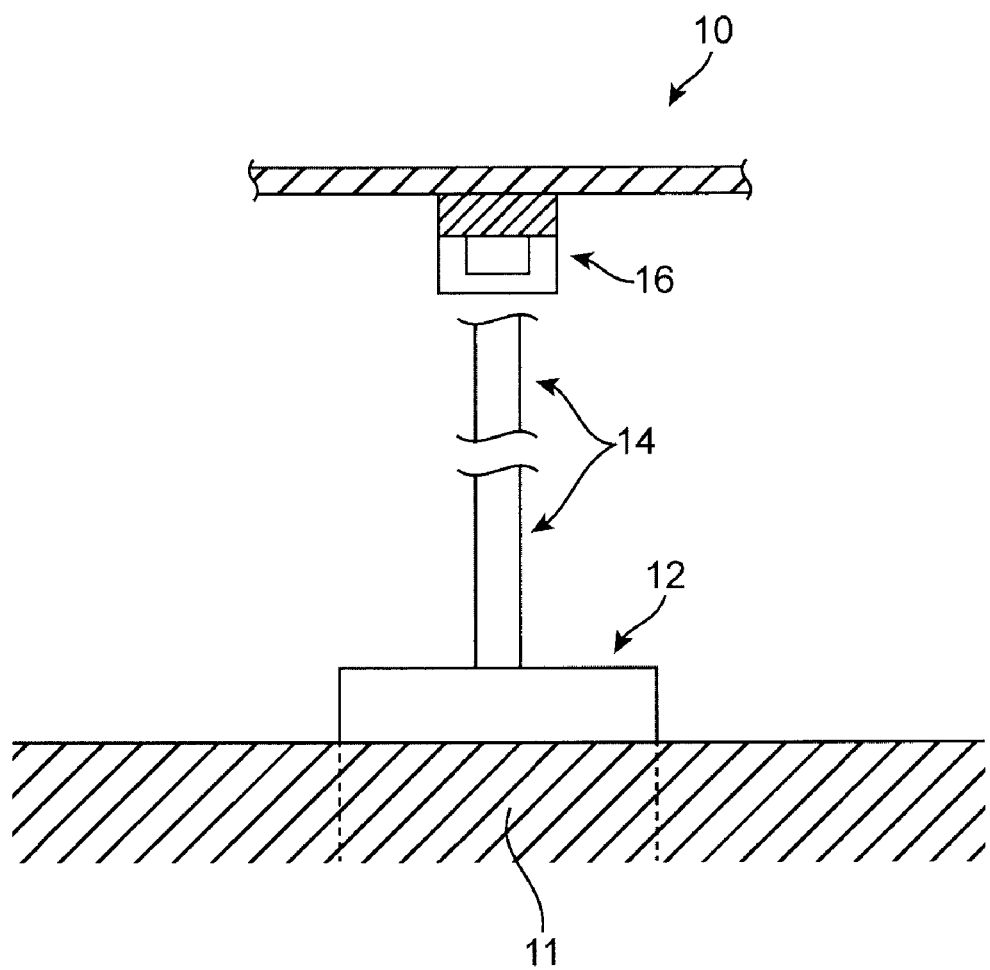
FIG. 1A is a simplified illustration of a mounting system, according to an embodiment.

FIG. 1A is a simplified illustration of a mounting system in accordance with one or more embodiments. The mounting system 10 may comprise a base section 12, an extension section 14, and a grasp section 16. The grasp section 16 may secure the mounting system 10 to equipment, and array-like equipment in particular. According to one or more embodiments, the mounting system 10 serves to interconnect and secure an array of solar modules to a surface such as a rooftop.

The base section 12 secures the mounting system 10 to an underlying surface 11. In applications such as solar module arrays, the base section 12 may be employed with weather proofing features such as flashing structures. The extension section 14 may comprise one or more members, such as pipes and/or other structures, which combine to provide a separation height between the mounted equipment and the underlying surface 11. In an embodiment such as described below, the extension section includes, for example, a combination of a connector and a pipe, with a skirt feature provided thereon.

As will be described, one or more sections or features of the mounting system 10 may be adjustable in height, laterally, or in combination. In particular, one or more embodiments enable a height of the grasp section 16 to be altered, so as to enable the grasp section 16 to be tilted to angles or alignments that are dictated or preferred during installation.

Accordingly, the extension section 14 may attach to the base section 12 with a first type of securement. The grasp section 16 may connect to a member or other feature of the equipment with a second type of securement. Various types of securement for use with embodiments are described below. Likewise, various features for enabling height and angular adjustment of the grasp section 16 and other elements are also described below, according to different embodiments.

Among other benefits, embodiments described herein provide a mounting system that is able to support heavy and/or delicate equipment that requires field installation. As mentioned, examples of such equipment include solar module arrays. Field installations provide various challenges, such as site-specific environmental aspects that require field adjustments to how the equipment is installed. The various embodiments described herein enable securement of solar module arrays and other equipment with a mounting system that enables height and/or tilt adjustment in the field and at the time of installation.

Wedge-Shaped Clamping

Figure 1B:
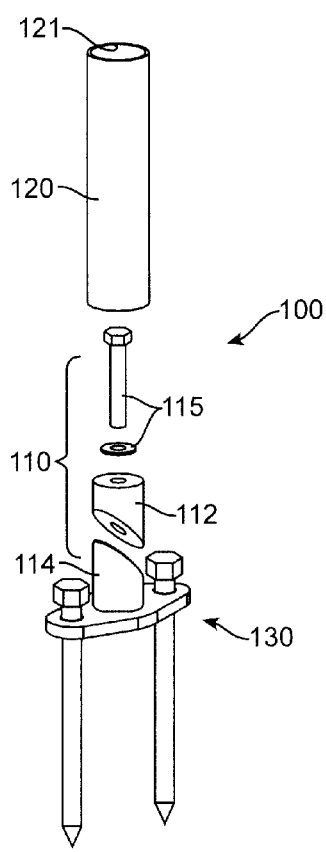
FIG. 1B and FIG. 1C illustrate a mounting system illustrate a mounting system that uses wedged-shaped members for supporting equipment such as solar panel arrays, according to an embodiment.
Figure 1C:
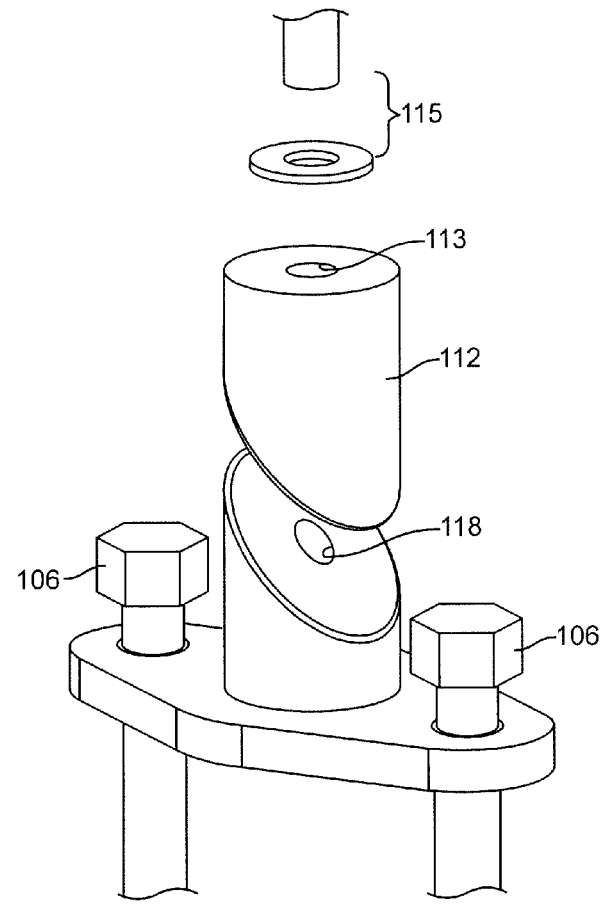

FIG. 1B and FIG. 1C illustrate a mounting system for supporting mounted equipment, according to an embodiment. In particular, an embodiment such as shown and described may be used to support array type structures and assemblies that include both horizontal and vertical supports. Still further, embodiments described herein may be used to support assemblies that utilize strut runners, which may span an array assembly in one direction (e.g. along a horizontal or Y axis), while components of the assembly are secured using other members that span another direction. More specifically, one or more embodiments provide for the use of a mounting system (such as shown and described with an embodiment of FIG. 1B and FIG. 1C or elsewhere) to support an array of solar modules.

With reference to an embodiment of FIG. 1B and FIG. 1C, a mounting system 100 includes a wedged clamping sub-system 110, a pipe 120, and a foot 130. The pipe 120 corresponds to or provides an element of an extension section (see FIG. 1A), and foot 130 provides an example of the base. Likewise, the wedged clamping sub-system 110 illustrates an interconnect between a base section (foot 130) and the extension member (pipe 120). The wedged clamping subsystem 110 includes a top wedged-shaped member 112 and a bottom wedged-shape member 114.

The wedged-shaped members 112, 114 may be combined and contained together within the pipe 120. More specifically, when the two wedged-shaped members 112, 114 are compressed together, they also tend towards sliding away from each other, thereby exerting a clamping force. When the wedged-shaped members 112, 114 are fitted on the inside of the pipe 120, they can be compressed so as to exert a clamping force within the pipe 120. This clamping force on the inside of the pipe 120 prevents the pipe from being pulled upward and away from the foot 130. The bottom wedge-shaped member 114 is attached to the foot 130 on a surface that is to support the array. For example, the bottom wedge-shaped member 114 may be a unitarily formed extension of the foot 130 and attached thus to a rooftop on which the solar module array is to be mounted.

In one embodiment, the bottom wedge-shaped member 114 is designed to extend to a roof, ground or other surface and includes a threaded hole 118 at about its center. The upper wedge-shaped member 112 is free-floating and has a clearance hole 113 at about its center. A bolt/washer 115 or other securement member may be inserted into the clearance hole 113 of the upper wedged-shaped member 112 and then extended to insert into the threaded hole 118 of the bottom wedged-shaped member 114.

According to an embodiment, the foot 130 may be secured to a rooftop or other surface on which a solar module array is to be mounted. To secure the foot 130, securements such as lag bolts 106 may be used to penetrate a suitable thickness of the underlying surface. The bolt/washer 115 and upper wedge-shaped member 112 may be secured or assembled together and then inserted into the threaded hole 118 of the bottom wedged-shaped member 114. In one implementation, the bottom wedged-shaped member 114 is a unitary extension from the foot 130. The pipe 120 is then assembled from above and aligned over the wedged clamping sub-system 110 (which includes the wedged-shaped members 112, 114 and bolt 115). The mechanism may be tightened to a desired amount by inserting a tightening tool (not shown), like a socket ratchet with a sufficiently long extension, into a top end 121 of pipe 120. The tool may be used to engage a driving or engagement feature of the bolt of the bolt/washer 115.

Star-Washer Clamping Sub-System

Star-washers are another common device used to attach a fixed base to a tubular extension such as in the steering tube of a bicycle. With a star-washer design, access to tighten the system is from above, not from the sides. This allows for access for tightening the system even though the foot may be sunk deep into insulation, a flashing, or other roofing materials.

FIG. 2A and FIG. 2B illustrate a mounting system that uses a star-washer sub-assembly to interconnect the base with an extension section, under an embodiment of the invention. As an alternative to, for example, the wedged-shaped clamping sub-system 110, an embodiment of FIG. 2A and FIG. 2B provides for a mounting system 200 similar in purpose to embodiments of FIG. 1B and FIG. 1C, but which utilizes a star-washer clamping sub-system 210. The star-washer clamping sub-system 210 allows the pipe 120 to be clamped to a foot 230. As mentioned with an embodiment of FIG. 1B and FIG. 1C, the foot 230 may secure or attach to a roof or other surface where the solar module array is to be mounted.

In one embodiment, the star-washer clamping sub-system 210 is a conically, or slightly conically shaped, and constructed such that it can be compressed axially by tightening a bolt and washer assembly 215. When tightened in this manner, the star-shaped washer 212 expands radially, thereby exerting a force on the inside diameter of the pipe 120. This force is applied to the pipe 120 by the sharp and stiff outside edge of the star-shaped washer 212, which are part of an expanding radial perimeter when the tightening occurs. The expansion of the star-shaped washer 212 prevents the pipe 120 from being pulled upward away from the underlying surface.

According to an embodiment, mounting system 200 may be installed by attaching the foot 230 to the surface where the solar module array is to be mounted. The foot 230 may attach to the underlying surface using lag bolts 206 or other similar attachment mechanisms. The star-washer 212 and bolt/washer 215 may be assembled together and threaded into a threaded hole 218 of an extension piece 214 of the foot 230. The pipe 120 may then be assembled from above and pressed over the star-washer clamping sub-system 210, including the foot 230 and its cylindrical protrusion 214. To increase the locking force, an embodiment provides that a tightening tool, like a socket ratchet with a long extension, is inserted into a top end 121 of the pipe 120 so as to engage the bolt of the bolt/washer 215.

Among other advantages, with a star-washer design, access to tighten the system is from above, not from the sides. This allows for access for tightening the mounting system 200, even in situations where the foot 230 is deeply sunk into insulation, flashing, or other materials of the underlying support structure.

Mounting Leveling

With regard to any of the embodiments described above, an embodiment provides structural features to enable adjustment of a mounted solar panel assembly. Since it is common for mounting surfaces, such as rooftops or the ground to be uneven or sloped, it is desirable for the equipment to be leveled for aesthetics and for ease of installation. Under conventional techniques, each supporting pipe must be cut to the exact length for the system to be level, and once assembled, the system is no longer adjustable. In contrast to this labor-intensive approach, embodiments such as described below enable for leveling to performed after the mounting assembly is installed. The adjustments needed for performing leveling may be made without precision cutting or other labor-intensive efforts, but rather with manual adjustments that permit on-sight adjustments.

Figure 3B:
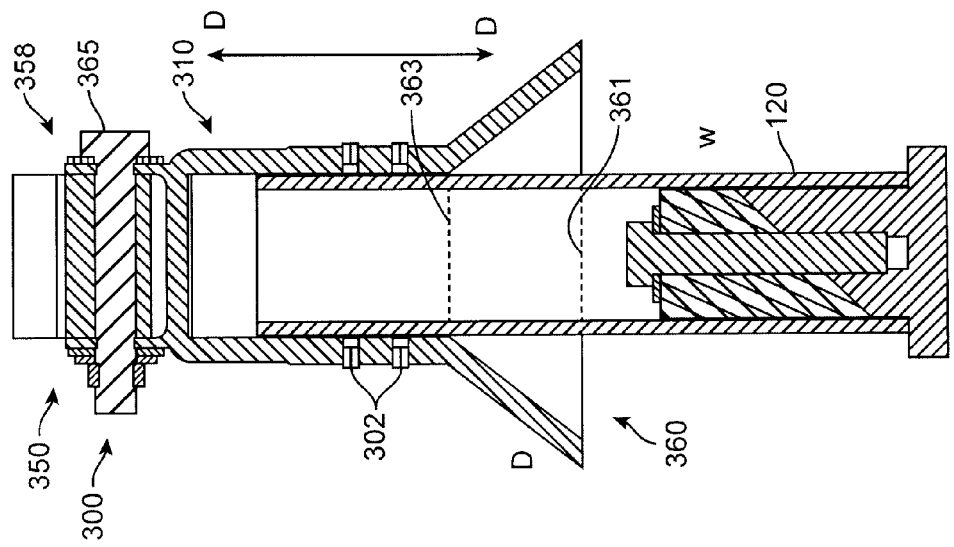
FIG. 3B is a side cross-sectional view of an embodiment of FIG. 3A, cut along lines A-A, under an embodiment.
Figure 3A:
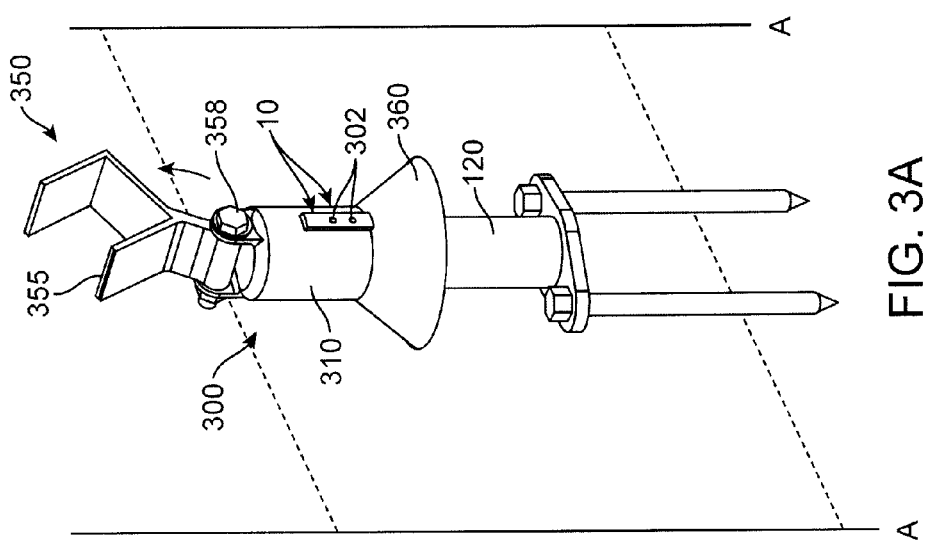
FIG. 3A illustrates a leveling sub-assembly or structure that may be attached or otherwise integrated into a mounting system, according to an embodiment.

FIG. 3A illustrates a leveling sub-assembly or structure that may be attached or otherwise integrated into a mounting system such as shown and described above. A leveling sub-assembly 300 provides the ability for an installer to adjust a level or installation angle of segments of equipment mounted on the rooftop or ground. In an embodiment, the leveling sub-assembly 300 includes components that extend, integrate or attach to a mounting system, and components that also couple or retain a support structure for the solar module array. In one embodiment, the leveling sub-assembly 300 includes an upper connector 310 that attaches or integrates with a mounting system in accordance with any of the embodiments described herein. The upper connector 310 is structured to be capable of sliding up and down the pipe 120 to accommodate different mounting heights. In one implementation, the upper connector 310 includes multiple locking setscrews 302 or similar fasteners to secure or otherwise lock onto the pipe 120 at any one of many different positions.

A grasp structure 350 may be provided on top of the upper connector 310. The grasp structure 350 includes a grasp end 355 that is dimensioned or otherwise structured or configured to grasp a member of the supported array. For example, in one implementation, the grasp end 355 retains or supports a strut runner of a solar module array. The grasp end 355 may pivot about one or more axes using a hinged connector 358. When pivoted into position, the grasp end 355 may serve to level a section of the supported solar module assembly. Multiple grasp ends distributed on the mounting system may combine to provide a desired tilt or leveling angle for the mounted array.

FIG. 3B is a side cross-sectional view of an embodiment of FIG. 3A, as cut along lines A-A. In FIG. 3B, the leveling sub-assembly 300 is shown to fit over pipe 120. With use of set screws 302 or other fasteners or connectors, the upper connector 310 is able to slide vertically on pipe 120 a distance shown by arrows D. The pipe 120 may be secured as part of an assembled mounting system such as shown and described with any of FIG. 1B, FIG. 1C, FIG. 2A or FIG. 2B. The grasp 350 may be connected to the connector 310 through the hinged connector 358. Under one implementation, the hinged connector 358 includes a bolt 365 or other member about which the grasp end 355 can pivot.

Waterproofing Features

As an additional or alternative feature, one or more embodiments may include a secondary waterproofing skirt to provide waterproofing protection to the mounted assembly. With reference to FIG. 3A, the connector 310 includes a skirt 360, which may be integrally or unitarily formed or attached onto the upper connector 310. The skirt 360 may correspond to a structure that has a cross-section 361 of maximum dimension and taper to a cross-section 363 of minimum dimension at a height above. With this geometry, rainwater or other moisture may be directed outward while falling downward to the mounting assembly and underlying surface.

As another alternative or addition, an embodiment of FIG. 4A illustrates a mounting assembly 400 with multiple water proofing features. One waterproofing feature corresponds to skirt 360, which is formed as part of the upper connector 310. As described with other embodiments, the mounting assembly 400 may be used to support a solar module array or other array structures on rooftops or other surfaces. The mounting assembly 400 may include a flashing sub-assembly 410.

In an embodiment, the flashing sub-assembly 410 includes a conically shaped flashing member 412 that is unitarily or otherwise integrated with a platform 414. The platform 414 may be planar and thin in dimension to form a suitable flashing surface. The platform 414 may flash for the foot 430, which may be structured in accordance with any of the embodiments described above.

In combination, skirt 360 diverts rainwater from coming into contact with the pipe 120. An embodiment recognizes that the pipe 120 is a most likely place for water leakage onto the underlying body, and reduction of water that falls into this area when the mounting assembly is assembled further reduces the possibility of leakage. In this manner, the skirt 360 provides a weatherproofed counter-flashing over the flashing member 412, which may be integrated with a rooftop or other surface through platform 414 to seal the pipe 120 and foot 430 against water intrusion.

FIG. 4B is a side cross-sectional view of FIG. 4A, cut along lines B-B. In an embodiment, the flashing sub-assembly 410 includes the extension 412 that extends conically from the platform 414 to taper into top section 419. The skirt 360 extends outward over the top section 419. In one implementation, the skirt 360 is dimensioned so that it extends further outward of top section 419 of the extension 412. In other words, a widthwise dimension of the cross-section 361 of skirt 360 may be greater than the dimension of the top section 419 of the extension 412. This assists the skirt's diversion of water away from the gap that may exist between top section 419 and pipe 120.

Grasp Structure

Embodiments described above provide for use of a grasp structure (e.g. grasp 350 and grasp end 355) to attach or secure the mounting assembly to the strut runner or other support member of the installed equipment. Embodiments described in this section illustrate different implementations for using the grasp structure to secure the mounting assembly to a strut runner member or other support structure.

Figure 5B:
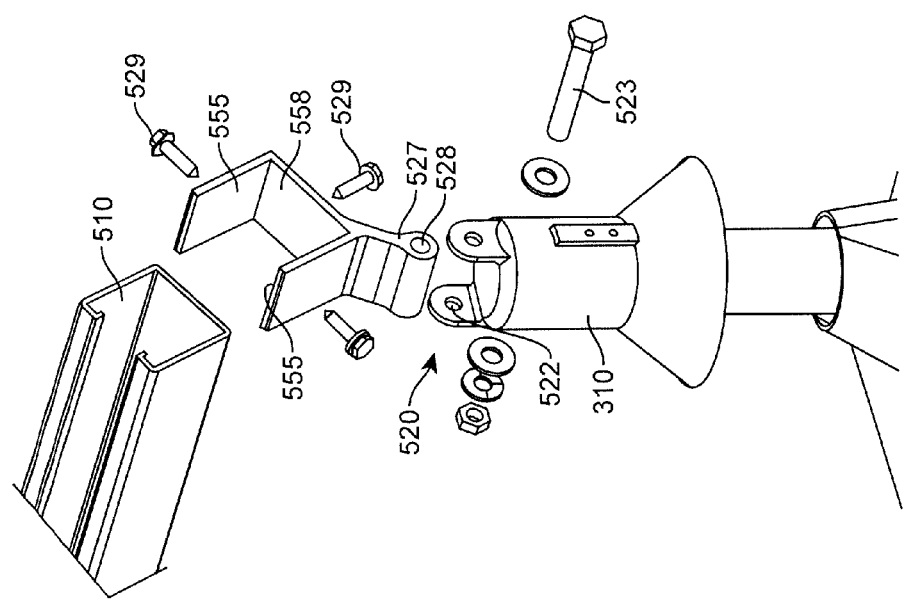
FIG. 5A and FIG. 5B illustrate a grasp structure for use with an embodiment of the invention.
Figure 5A:
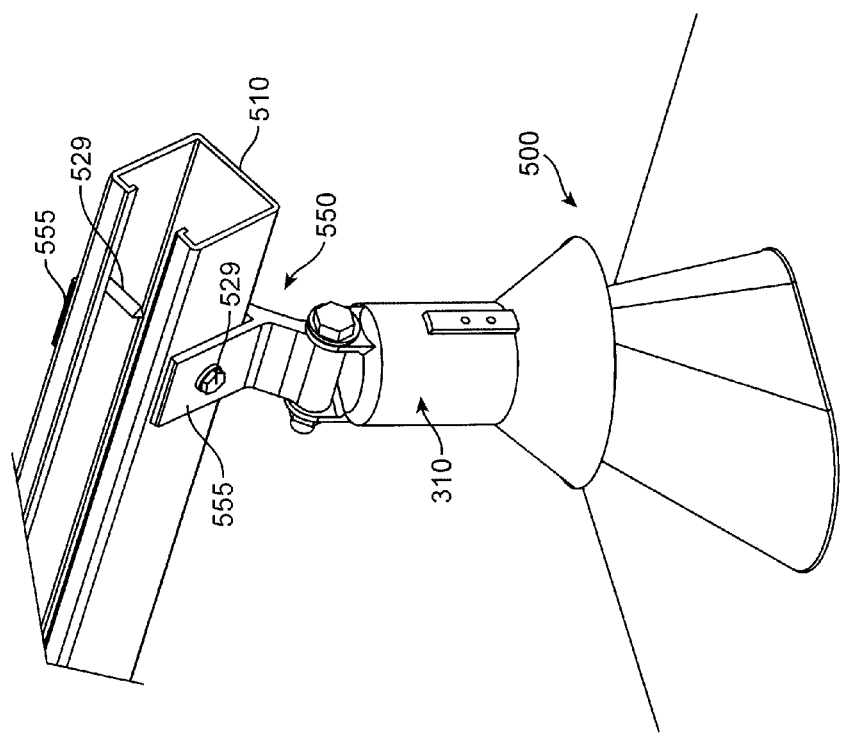

More specifically, FIG. 5A and FIG. 5B illustrate a grasp structure for use in enabling adjustments and pivoting for mounted equipment, according to an embodiment of the invention. A grasp structure 550 such as shown and described enables a circular or other cross-section of the mounting assembly to be interconnected with a rectangular cross-sectioned strut member 510 that forms part of the mounted solar module array. The strut member 510 may be secured to the mounting assembly 500 by upper connector 310. When connected, the strut member 510 is able to pivot along one axis.

According to an embodiment, upper connector 310 has a sub-system or multiple sub-systems that provide a pivoting mounting point. In one embodiment, a securement structure 520 includes receiving holes 522 for a member that retains the connection. Another part, called the pivot hinge structure 527 provides a pivoting mounting point in the form of a pivot hinge hole 528. The pivot hinge structure 527 may be assembled with the upper connector 310 so that the pivot hinge hole 528 and receiving holes 522 are aligned. A connecting bolt 523 may then be installed through the holes, so that the connection is secure and creates a pivot point.

The grasp structure 550 may include grasp walls 555 that define a receiving cavity 558 for the strut member of the mounted assembly. The cavity 558 may be shaped to accept the cross-sectional shape of the member, which in embodiments described, is rectangular. To secure the strut member 510 to the hinge structure 527, multiple fasteners, such as screws 529, may be used to fasten the two parts together. Other fasteners such as those that are riveted or bolted may also be used.

Figure 6C:
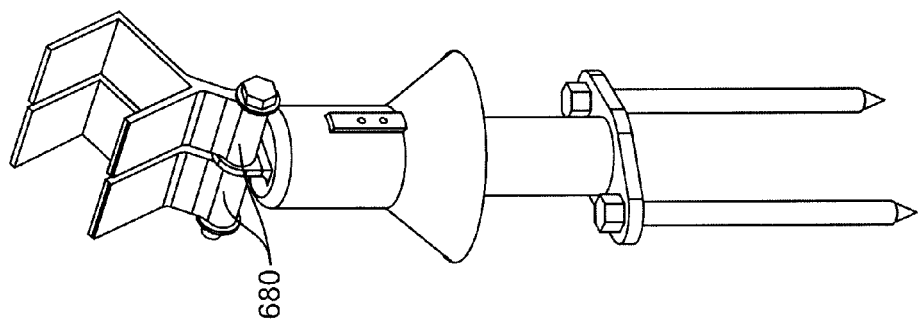
FIG. 6A thru FIG. 6C illustrate various alternatives for a suitable grasp structure, in accordance with one or more embodiments of the invention.
Figure 6B:
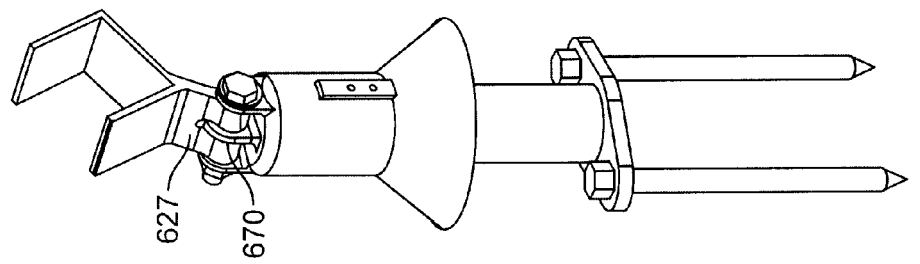
Figure 6A:
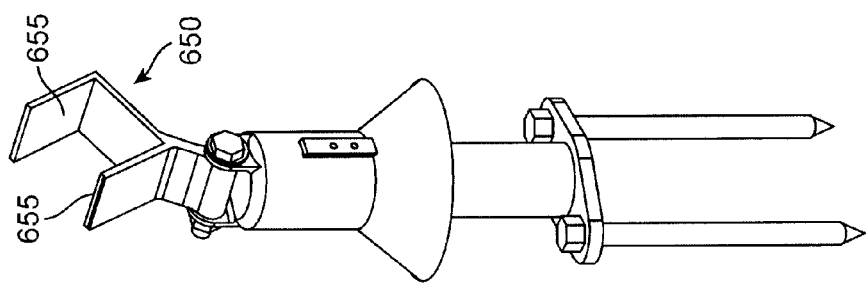

FIG. 6A thru FIG. 6C illustrate various alternatives for a suitable grasp structure, in accordance with one or more embodiments of the invention. In FIG. 6A, the grasp structure 650 is similar to that shown with FIG. 5A and FIG. 5B, except the grasp uses friction fitting rather than screws or fasteners. The grasp walls 655 may be dimensioned and sufficiently flexible to enable the strut member 510 (FIG. 5A) to be received, and tightly fitted within the cavity.

FIG. 6B illustrates a variation in which an alternative hinge support structure 670 is used to support the pivot hinge structure 627. FIG. 6C illustrates the use of an alternative double grasp structure 680 to provide additional support for retaining the strut members. Each of the double grasp structures may be structured in accordance with any of the embodiments described above. The additional hinge support structure 627 may also be used to support the extra size of the double grasp structures 680.

Mounted Solar Module Array

Figure 7A:
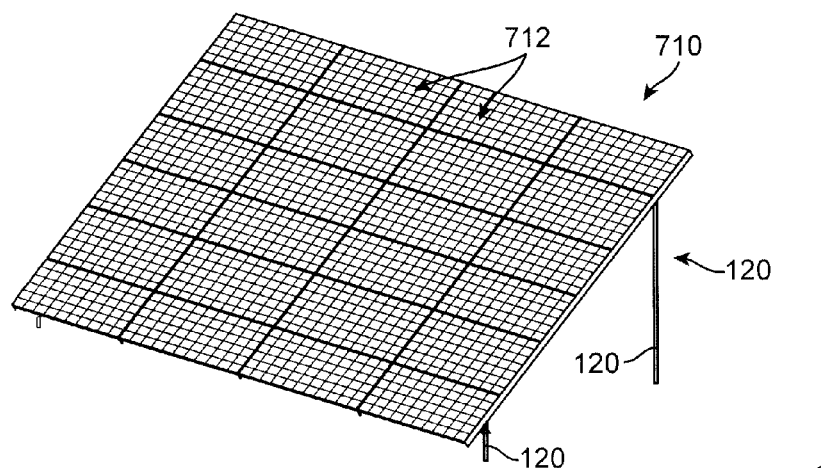
FIG. 7A illustrates a solar module array which may be mounted into position on an underlying surface using any of the embodiments described herein.
Figure 7B:
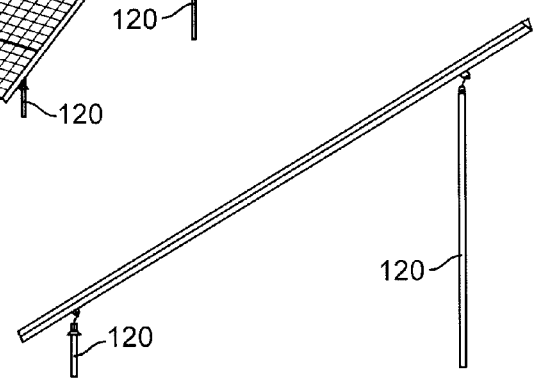
FIG. 7B is a side view of a mounted solar module array, using mounting assemblies such as described with embodiments provided herein.
Figure 7C:
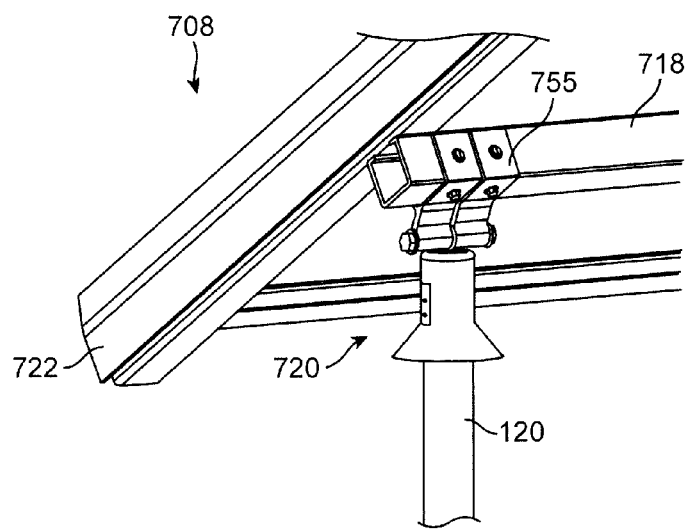
FIG. 7C shows a close-up of a front pivot connection point, according to an embodiment.

FIG. 7A through FIG. 7C illustrate various configurations of a mounted solar module array, according to one or more embodiments described herein. FIG. 7A illustrates a solar module array 710 which may be mounted into position on an underlying surface 708 using any of the embodiments described above as a means by which the array is held upright and/or interconnected to the underlying surface 708. In FIG. 7A, the solar modules 712 that comprise the array 710 span both horizontal and vertical directions. The entire array 710 may be held upright at an angle or flat, depending on various factors. The underlying surface 708 may correspond to, for example, a rooftop.

In an embodiment, the array 710 may be supported on the underlying surface 708 with multiple mounting assemblies, such as shown and described with any of the embodiments provided herein. Accordingly, multiple pipes 120 may serve as extension sections that extend downward from the array 710 to the underlying surface 708.

FIG. 7B is a side view of a mounted solar module array, using mounting assemblies such as described with embodiments provided herein. Individual solar modules 712 (FIG. 7A) that comprise the array may be attached to the strut members 718 (FIG. 7C) for support. U.S. patent application Ser. No. 10/855,254, which is hereby incorporated by reference in its entirety, describes mechanisms by which the strut member 718 may connect to the solar modules 712 as part of the array. However, many other means of supporting equipment from the strut member 718 are also possible, including other commercially available racking systems for solar modules.

FIG. 7C shows a close-up of a front pivot connection point, under an embodiment of the invention. The front pivot connection point may be provided as part of a top section 720 of a mounting assembly such as described with any of the embodiments herein. A grasp 750 may include a grasp end 755 which secures to the strut member 718 as it spans the array 710 in the horizontal direction. In an implementation shown, separate rails 722 may span the array 710 in the vertical direction. The rails 722 may correspond to compression rails, which secure individual modules in place as part of the array 710.

Adjustable Rear Supports

As an addition or alternative feature, one or more embodiments provide for use of adjustable rear supports in addition to mounting assemblies such as described with any of the embodiments described herein.

FIG. 8A thru FIG. 8D illustrate the use of adjustable supports with mounting assemblies such as described herein, under an embodiment of the invention. The pipe 120 of a mounting assembly extends upward from the underlying surface (not shown). But rather than extend to the strut member of the array 810, the pipe 120 extends to an adjustable support member 850. In one embodiment, the pipe 120 connects to adjustable supports to form rear supporting legs. The adjustable supports 850 allow the equipment to be easily tilted to a range of angles through a telescoping mechanism.

Figure 8A:
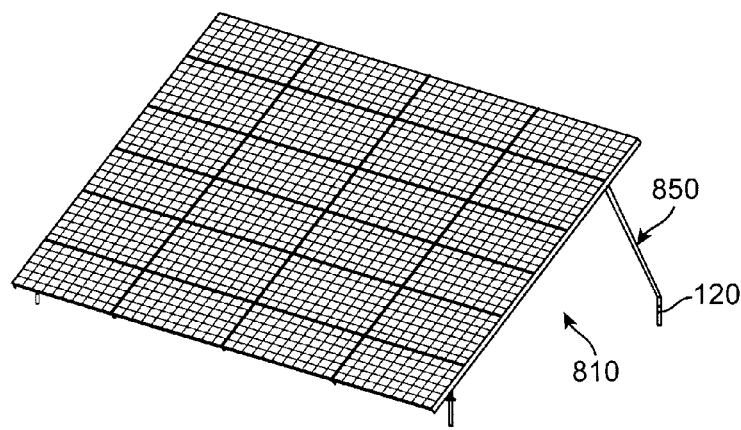
FIG. 8A shows solar module array mounted with adjustable supports, under an embodiment.
Figure 8B:
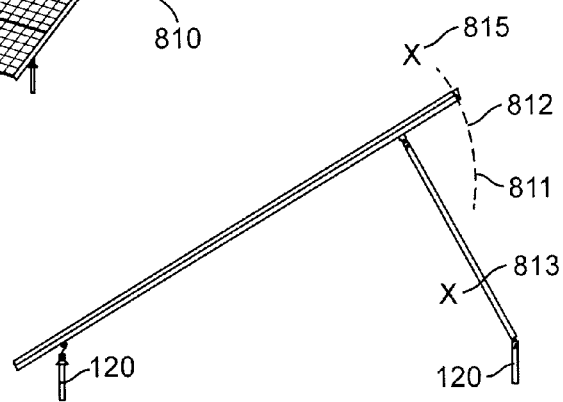
FIG. 8B is a side view of a solar module array, showing a range of adjustment that may be achieved, under an embodiment of the invention.

FIG. 8A shows solar module array 810 mounted with adjustable supports 850, which form telescoping mounting supports. FIG. 8B is a side view of the array 810, showing the range of adjustment that may be achieved. A top end 812 of the array 810 may be moved along an arc 811 from a minimum height position 813 to a maximum height position 815, depending on the needs or preferences of the installation or installer.

Figure 8C:
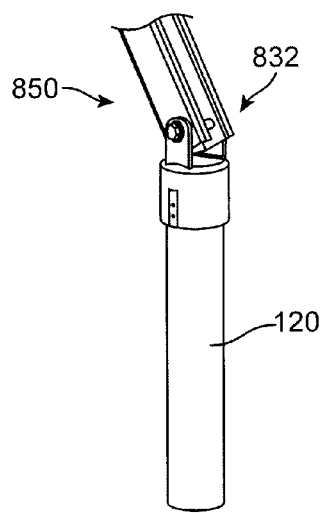
FIG. 8C shows a pivoting connection between a pipe and an adjustable support member, under an embodiment.

FIG. 8C shows a pivoting connection 832 between the pipe 120 and the adjustable support member 850, under an embodiment of the invention. The adjustable support member 850 may telescope, so that its overall length may be increased or decreased on site. The pivoting connection enables the top end 812 (FIG. 8B) of the array 810 to be raised when the length of the adjustable support member 850 is increased. Likewise, the pivoting connection enables the top end 812 of the array 810 to be lowered when the length of the adjustable support member 850 is decreased.

Figure 8D:
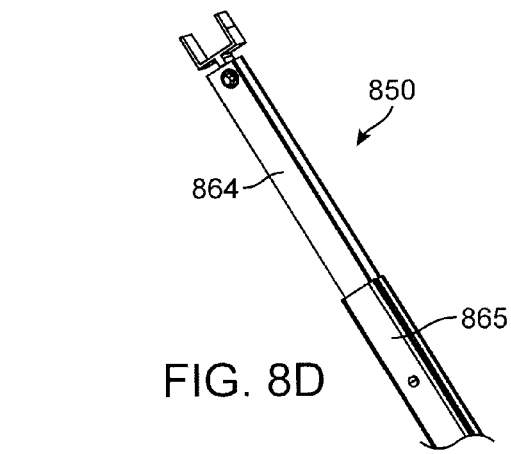
FIG. 8D illustrates a construction of the adjustable support member, according to an embodiment.

FIG. 8D illustrates a construction of the adjustable support member 850, according to an embodiment of the invention. In an embodiment, the adjustable support member 850 includes an upper portion 864 and a lower portion 865 that telescope or interleave with respect to one another to form the adjustable support member 850. Additional telescoping or interleaving members may also be incorporated. A telescoping interleave of the upper portion 864 and lower portion 865 sets the effective height of the adjustable support member 850 and allows a range of possible mounting angles for the equipment.

Alternatives and Conclusion

Although an embodiment of FIG. 1B and FIG. 1C utilize a stem sub-system, one or more embodiments may employ a star-washer configuration such as illustrated in FIG. 2A and FIG. 2B.

Each embodiment described in this application may stand on its own or in combination with other embodiments. As an example, it might be unwise to use features that secure inside the pipe for the rear pipe support illustrated in FIG. 7A and FIG. 7B, as the pipe 120 may be 6-8 feet in length. Instead, it may be preferable to thread the base of the pipe 120 to be accepted into a commercial base flange or use a fitting such as those made by Hollaender of Cincinnati, Ohio. However, even if the lower attachment of the support is made using commercially available products, the benefits of the upper connector 310 (e.g. see FIG. 3A) still exist at the top of the rear support pipe with regards to creating a pivot point and providing leveling. This is but one example where combinations of various embodiments of a mounting assembly may be combined with each other or with pre-existing components to yield new and improved complete mounting systems.

As another variation, other configurations for the upper connector (e.g. see element 310 of FIG. 3A) are contemplated. The upper connector may include a non-pivoting style that simply provides a base for securing strut or other structural rails or components for the attachment of equipment or devices. Such an alternate upper connector may take the form of a simple cap with holes that can be used to bolt strut or structural rail to, which would allow the strut or rail to in turn be secured to the pipe. This configuration would be useful for installations that are mounted flush or parallel to the mounting surface as opposed to the tilted configurations illustrated above. Also, it should be understood that the upper connector can be used to transition from structural pipe or tube to any means of secondary supports or equipment. The use of strut as a secondary support is only illustrative in nature and the invention should not be restricted to this particular embodiment.

Although embodiments provided herein describe primarily mounting assemblies for supporting solar modules arrays, a wide range of alternate equipment can be mounted using embodiments described herein. Such alternate equipment may range from heating ventilation and air-conditioning (HVAC) equipment to pipes and conduit, and on to surfaces such as billboards or even suspended roof surfaces such as carports, atriums or shading structures.

The list of potential configurations and/or modifications in which the individual embodiments can be deployed or combined are numerous. It should be understood that the specific embodiments and configurations used here are illustrative in nature and not meant to limit the scope or application of the inventions described.

What is claimed is:

1. An installed and mounted solar module system comprising:
   a solar module array comprising a plurality of solar modules;
   a mounting system for supporting the solar module array on an underlying surface, the mounting system providing a plurality of mounting points, wherein at one or more of the plurality of mounting points, the mounting system comprises:
      a foot that is structured to secure to the underlying surface;
      a pipe coupled to the base so as to extend a height from a underlying surface; and
      a grasp that is coupled to a top section of pipe and is structured to secure to a section of the equipment when the equipment is installed on the underlying surface.

2. The installed system of claim 1, wherein the underlying surface is a rooftop, and wherein the foot penetrates at least a section of the rooftop.

3. The installed system of claim 2, further comprising:
   a first wedged-shaped member and a second wedged-shaped member, the first wedged-shaped member extending from the foot, and the second wedged-shaped section being dimensioned to fit within the pipe, wherein the first wedged-shaped section and the second wedged-shaped section combine to secure the pipe to the foot.

4. The installed system of claim 2, further comprising:
   a star-shaped clamping sub-system to connect the pipe to the foot.

5. The installed system of claim 4, wherein the star-shaped clamping sub-system comprises a star shaped washer and a bolt, wherein the star-shaped washer is structured to mate with the bolt and to expand radially when mated with the bolt;
   wherein the bolt extends into the foot, and
   wherein the star-shaped washer retains the pipe securely with the foot when expanded radially from within the pipe.

6. The installed system of claim 2, wherein the base includes one or more flashing structures to deter water.

7. The installed system of claim 1, wherein the pipe is pivotally coupled to the grasp section.

8. The installed system of claim 1, wherein the system is installed by adjusting one or more of (i) an angle of the grasp, or (ii) a dimension that the pipe extends from the underlying surface.

9. The installed system of claim 1, wherein the system is installed by first installing the mounting system, and then adjusting one or more components of the installed mounting system to receive the solar module array.

10. The installed system of claim 1, further comprising a base, wherein the base is installed into the underlying surface and includes one or more flashing features.

11. The installed system of claim 10, wherein the grasp includes a skirt feature that forms a counter-flash for the one or more flashing features of the base.

12. The installed system of claim 10, wherein the pipe and the base provide or are coupled to a wedged-shaped sub-assembly for enabling the pipe and the base to be coupled to one another.

13. The installed system of claim 10, wherein the pipe and the base are coupled using a star-shaped washer.

14. The installed system of claim 10, further comprising an adjustable support that extends from the underlying surface to connect the pipe to the base, wherein the adjustable support enables a top end of the solar module array to be moved along an arc.

15. The installed system of claim 14, wherein the adjustable support includes two or more members that telescope or interleave with one another to adjust an overall length of the adjustable member.

\* \* \* \* \*